United States Patent
Carter

(10) Patent No.: US 6,205,897 B1
(45) Date of Patent: Mar. 27, 2001

(54) PIPE CUTTER AND METHOD OF CUTTING PIPE

(76) Inventor: Sam W. Carter, 4170 Indian Hills Trail, West Branch, MI (US) 48661

(*) Notice: Subject to any disclaimer, the term of this patent is extended or adjusted under 35 U.S.C. 154(b) by 0 days.

(21) Appl. No.: 09/287,473

(22) Filed: Apr. 6, 1999

Related U.S. Application Data

(60) Provisional application No. 60/081,166, filed on Apr. 8, 1998.

(51) Int. Cl.[7] ........................................................ B26D 7/02
(52) U.S. Cl. ............................ 83/54; 83/454; 83/468.4; 30/92; 30/371; 30/374
(58) Field of Search ................................ 30/371–374, 92; 83/54, 452, 455, 468.1, 468.4

(56) References Cited

U.S. PATENT DOCUMENTS

| | | |
|---|---|---|
| 466,929 | 1/1892 | LanFair . |
| 793,796 | 7/1905 | Mummert . |
| 2,568,791 | 9/1951 | Cooper . |
| 3,449,992 | 6/1969 | Hanaway . |
| 3,481,374 | 12/1969 | Schindler . |
| 3,763,733 | 10/1973 | Jambor . |
| 3,858,317 * | 1/1975 | Ford et al. .............................. 30/372 |
| 4,051,597 | 10/1977 | Cardoza . |
| 4,485,715 * | 12/1984 | Hytti ..................................... 30/374 |
| 4,566,190 | 1/1986 | Isakson . |
| 4,656,742 * | 4/1987 | Wagner ................................. 30/372 |
| 4,676,001 * | 6/1987 | Wagner ................................. 30/372 |
| 4,747,212 * | 5/1988 | Cavdek ................................. 30/374 |
| 4,876,793 | 10/1989 | Quaglia . |
| 4,962,588 * | 10/1990 | Fushiya et al. ....................... 30/372 |
| 5,179,781 | 1/1993 | Weaver . |
| 5,611,146 | 3/1997 | Ducret . |
| 5,632,089 * | 5/1997 | Sakamoto et al. .................... 30/372 |
| 5,737,990 | 4/1998 | Freeland et al. . |
| 5,806,187 | 9/1998 | Ducret . |

* cited by examiner

Primary Examiner—M. Rachuba
(74) Attorney, Agent, or Firm—Reising, Ethington, Barnes, Kisselle, Learman & McCulloch, P.C.

(57) ABSTRACT

The pipe cutter includes a jigsaw with a motor that reciprocates a saw blade back and forth. A way is clamped to the jigsaw. A workpiece holder is slidably mounted on the way. The workpiece holder has a workpiece slot with a base, two side walls and a saw blade slot. A handle is attached to the workpiece holder. A pipe that is to be cut is placed in the workpiece slot and the workpiece holder is moved along the way toward the saw blade. The saw blade forces the pipe toward the base of the workpiece slot and cuts the pipe.

6 Claims, 6 Drawing Sheets

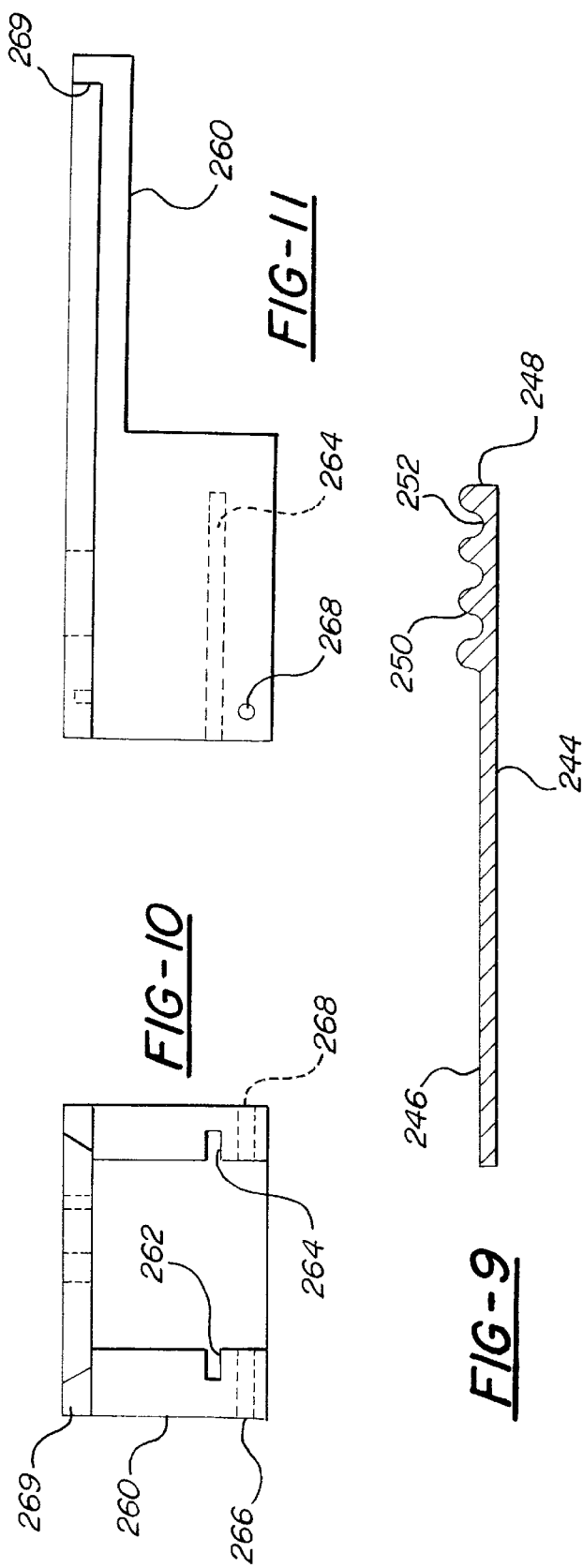

PIPE CUTTER AND METHOD OF CUTTING PIPE

The disclosure incorporates the pipe cutter and method of cutting pipe disclosed in provisional patent application 60/081,166, filed Apr. 8, 1998, whose priority is claimed for this application.

TECHNICAL FIELD

This invention relates to a pipe cutter and more particularly to a portable power saw for cutting pipe and rods.

BACKGROUND OF THE INVENTION

Copper tubing, plastic pipe and electric conduits are generally cut by a hand saw or by a pipe cutter tool with two guide rollers and a cutting disk that is advanced toward the pipe and the two rollers and is rotated about the axis of the pipe to sever the pipe. Both of these pipe cutting procedures are slow and require substantial physical effort.

The hand saw that is commonly used is a hacksaw. Hacksaws have a thin steel blade held in a frame and subjected to a tension load. These saws are difficult to guide accurately to form a straight cut. Cuts that are perpendicular to a pipe center line are desirable when attaching a pipe to a coupling. If the coupling is threaded, the end of the pipe that is inserted into the coupling must also be threaded. To cut good threads on a pipe, the end of the pipe must be perpendicular to the pipe center line. If the end is not perpendicular the threads may be crooked. A coupling that is connected by solder or adhesives usually includes a flange or stop members that limit penetration of the pipe into the coupling. If the end of the pipe is not perpendicular to the axis of the pipe, the pipe will not seat properly in the coupling.

Hack saw blades have small closely spaced teeth that cut material. These blades remove small particles of material on each cutting stroke and are therefore slow. It can take several minutes to cut one pipe. Even an exceptionally strong person can only cut a limited number of pipes per day due to the force and time required to make each cut.

The pipe cutters that have two rollers and a cutting disk generally work well and require minimal force from the operator. If the axis of the cutting disk is not parallel to the axis of the two rollers, the cutting disk will tend to form a spiral groove and move along the axis of the pipe. A more serious problem that occurs, even when the cutting disk is working properly, is a reduction in the inside diameter of the pipe where the pipe is cut. This reduction in the inside diameter of a cut fluid conveying pipe reduces flow rate and increases the pressure drop along the length of the system when fluid is flowing. The reduced inside diameter in electrical conduit increases the difficulty of pulling wire through the pipe. The ends of the pipe sections with reduced internal diameter have a sharp edge which can damage or even destroy the insulation covering on electrical wiring. The sharp edge can be eliminated with a reamer but the reduced diameter cannot be easily restored to the original diameter. This make it more difficult to pull electrical wires through the pipe and reduces the number or the size of the wires that can be received in the pipe.

Accurate cuts can be made by placing the pipe or rod that is to be cut in a precision machine tool. Due to the size weight and cost of precision machine tools and the time it takes to mount a pipe or rod in the tool and make a cut, it is not feasible to use such machines at a construction site or at a field repair site.

A cut through a tubular member with a hand saw or a powersaw is generally slow at the beginning and at the end. This is due to the large length of the surface in engagement with the saw teeth at the beginning and end of a cut and to the tendency of the saw teeth to fill with material chips and stop cutting.

There is a tendency of some pipes and rods to move in a direction transverse to the direction of the cut, and relative to the saw blade. Such movement results in the cut pipe or rod having an incorrect length. The movement may also result in the cut surface not being in a plane that is perpendicular to the long axis of the pipe or rod. Pipes and rods with outer surfaces that are not cylindrical are even more difficult to cut straight and in the desired location.

SUMMARY OF THE INVENTION

An object of the invention is to provide a power saw for cutting pipe.

Another object of the invention is to provide a power saw with a guide for restraining a pipe while it is cut.

A further object of the invention is to provide an attachment for a jigsaw that guides a jigsaw blade while cutting a pipe.

A still further object of the invention is to provide a power saw with a guide for restraining a pipe or rod while it is cut that permits rotation of the pipe or rod.

A yet still further object of the invention is to provide a power saw with a guide, for axially restraining a pipe or rod with a noncylindrical surface, while the pipe or rod is cut.

The pipe cutter includes a motor driven jigsaw with a saw blade that is reciprocated back and forth. A way member is clamped to the jigsaw by fasteners. A workpiece holder with a workpiece slot is slidably mounted on the way. Stops limit movement of the workpiece holder relative to the way.

The workpiece holder can be provided with multiple workpiece slots to accommodate pipes with different diameters. A handle is attached to the workpiece holder for moving the workpiece holder relative to the way. The handle has a pipe contact surface which cooperates with the workpiece slot to hold a pipe perpendicular to the path of movement of the workpiece holder.

The workpiece holder is slideably mounted on the way. A workpiece slot is provided in the workpiece holder for a pipe of the diameter that is to be cut. A pipe that is to be cut is inserted into the workpiece slot. The workpiece holder is then advanced toward the saw blade. The force exerted to hold the saw blade in contact with the pipe being cut urges the pipe into contact with the bottom or base of the workpiece slot.

The workpiece holder may also include a holder base and a workpiece engaging block. The workpiece engaging block is rotatably mounted in the holder base for rotation about an engaging block axis that is transverse to the path of the saw blade relative to the holder base. The workpiece engaging block has a first workpiece engaging surface that is an arc about a first engaging surface axis. The first engaging surface axis is parallel to the engaging block axis. A pair of second workpiece engaging surfaces are arcs about a second engaging surface axis. The second engaging surface axis is parallel to the engaging block axis and is spaced from the engaging block axis. A pair of third workpiece engaging surfaces may be provided if desired. A small diameter pipe or rod that is to be cut is held in contact with the first engaging surface during cutting. A pipe or rod with a radius that corresponds to the radius of the pair of second workpiece engaging surfaces, is held in contact with the second workpiece engaging surface during cutting. If a pair of third workpiece engaging surfaces is provided, a pipe or rod with a radius that corresponds to the radius of the third workpiece engaging surface is held in contact with the third workpiece engaging surfaces during cutting.

A workpiece engaging surface or surfaces can be provided with workpiece engaging lands that are received within grooves in the workpiece to positively position the workpiece along the long axis of the workpiece during cutting. These workpiece engaging lands are used when cutting stainless steel flexible gas pipe and similar pipes.

Some jigsaws have housings with integral mounting plates. When using the pipe and rod cutter attachment with these jigsaws, the way member is modified to attach directly to the mounting plate on the saw housing. This direct attachment to the saw housing can be more accurate and more rigid. An accurate and rigid mounting of the way member is necessary to obtain accurate cuts.

BRIEF DESCRIPTION OF THE DRAWINGS

FIG. 9 is an enlarged sectional view of the flexible pipe holder;

FIG. 10 is an end view of a way for a specific jigsaw;

FIG. 11 is a side elevational view of the way of FIG. 10;

FIG. 12 is an end view of way for another specific jigsaw; and

FIG. 13 is a side elevational view of the way of FIG. 12.

DESCRIPTION OF THE PREFERRED EMBODIMENT

Figure 1:
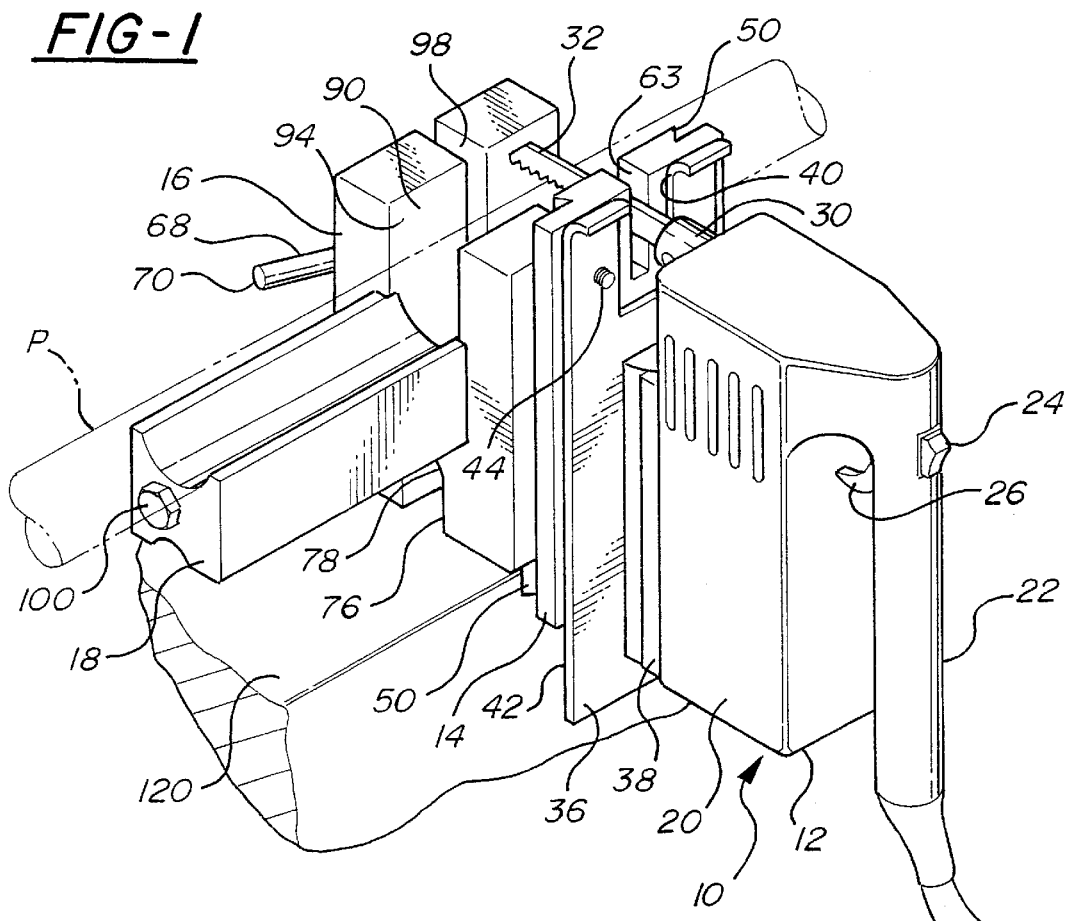
FIG. 1 is a perspective view of the pipe cutter.

The pipe cutter generally designated by the reference number 10 includes a jigsaw 12, a way 14, a workpiece holder 16 and a workpiece holder handle 18.

The jigsaw 12 is a standard electric powered jigsaw with a motor and drive housing 20. A handle 22 is integral with the housing 20. Switches 24 and 26 are mounted in the handle 20 and can be operated with the thumb and index finger to turn the motor on and off. An electric power cord 28 has an end (not shown) connected to an electric receptacle to supply power to run the electric motor in the housing 20. The jigsaw 12 could also be powered by a rechargeable battery. When the jigsaw 12 is running the driven shaft 30 reciprocates in and out of the housing 20. A saw blade 32 is received in a slot in the shaft 30 and clamped in place by a screw 34. The saw blade 32, when cutting metal should have at least 21 teeth per inch and should make at least 3,000 strokes per minute to make a good cut.

A shoe plate 36 is rigidly secured to a mounting block assembly 38. The mounting block assembly 38 is secured to the housing 20. The saw blade 32 extends through a slot 40 in the shoe plate 36. Shoe plates 36 are generally pivotally adjustable about an axis parallel to the long axis of the shoe plate. When the jigsaw 12 is used as part of a pipe cutter 10, the shoe plate 36 is locked in a position in which the contact surface 42 is perpendicular to the drive shaft 30.

Figure 3:
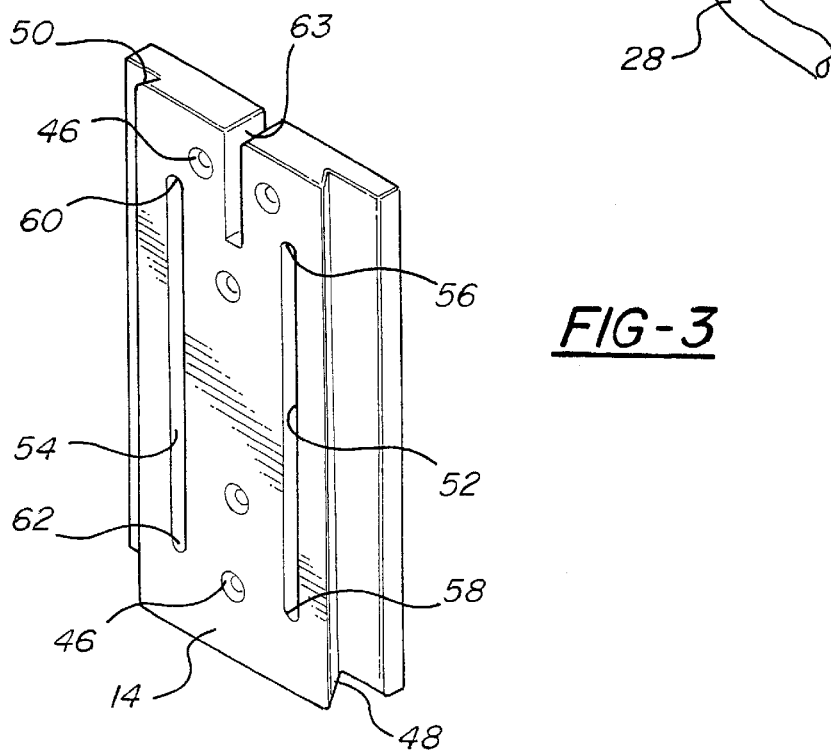
FIG. 3 is a perspective view of the way.
Figure 2:
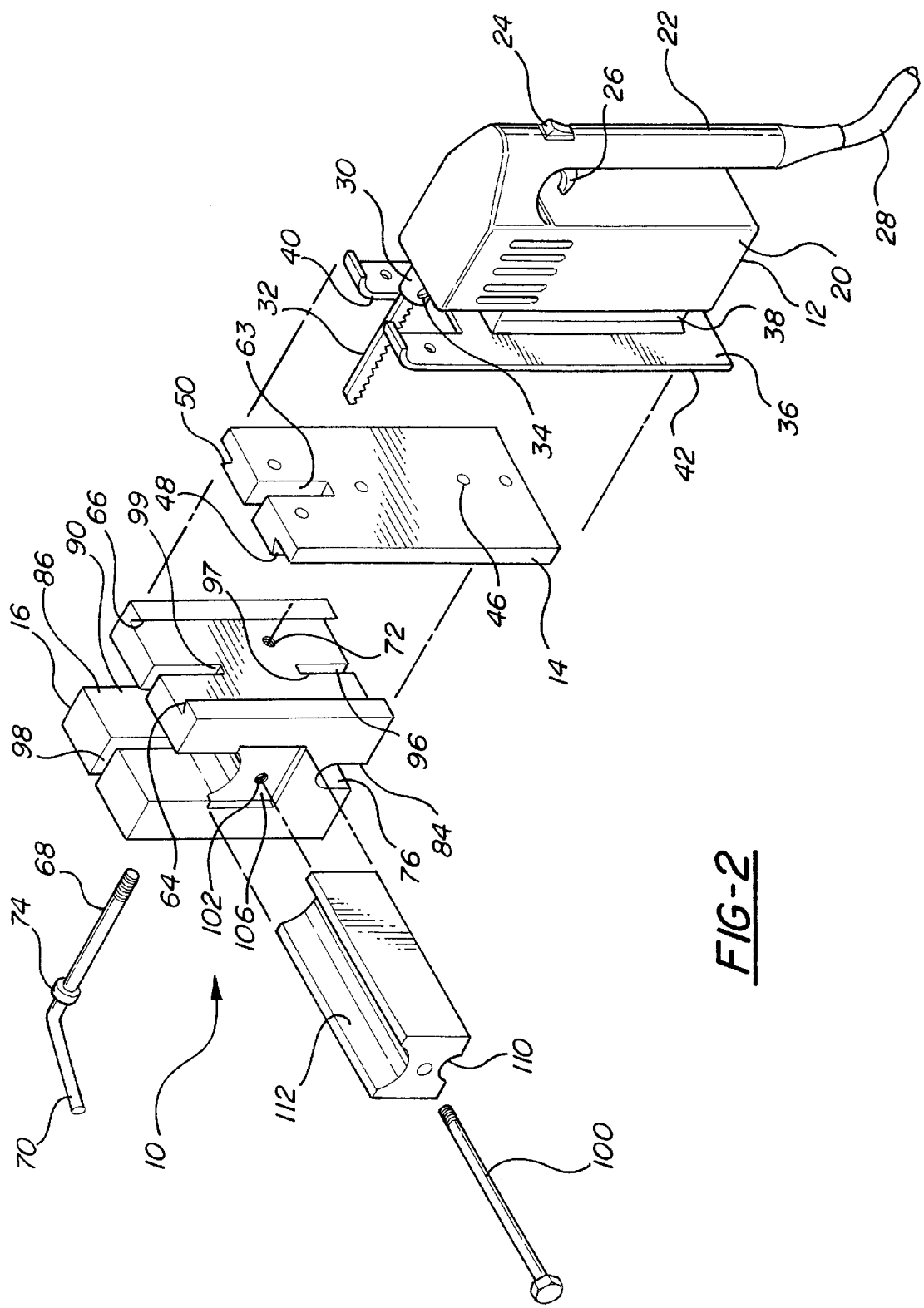
FIG. 2 is an expanded view of the pipe cutter attachment and electric jigsaw.
Figure 4:
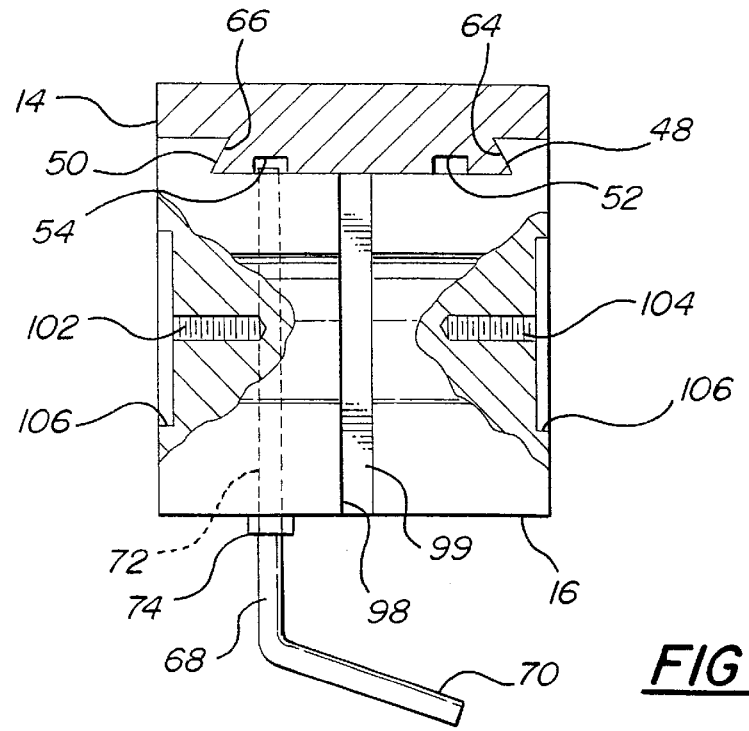
FIG. 4 is an enlarged top plan view of the workpiece holder with parts broken away and a sectional view of the way.

The way 14 is a generally flat plate secured to the contact surface 42 of the shoe plate 36 by a plurality of mechanical fasteners 44. These fasteners pass through bores 46 through the way 14. Machined surfaces 48 and 50 form a tenon of a dovetail joint. Two parallel grooves 52 and 54 are machined into the way 14 as shown in FIGS. 3 and 4. The groove 52 has ends 56 and 58. The groove 54 has ends 60 and 62. The function of the grooves 52 and 54 is explained below. A saw blade slot 63 is provided in one end of the way 14 so that portions of the way can extend along each side of saw blade 32.

The workpiece holder 16 is a block of material with parallel surfaces 64 and 66 that form the walls of a mortise. The mortise of the workpiece holder 16 is slid over the tenon of the way 14 to slideably connect the workpiece holder to the way. As shown in FIG. 4, the surface 50 on the way 14 is in sliding contact with the surface 66 on the workpiece holder 16 and the surface 48 on the way is in sliding contact with the surface 64 on the workpiece holder. A threaded pin member 68 with a handle 70 screws into a threaded bore 72 in the workpiece holder 16. As shown in FIG. 4, the pin member 68 extends into the groove 54 where it leaves the workpiece holder 16 free to slide relative to the way 14 and where it engages the ends 60 and 62 of the groove to limit movement of the workpiece holder 16 relative to the way 14. The pin member 68 can be rotated by the handle 70 and withdrawn from the groove 54. Once the pin member 68 is withdrawn from the groove 54, the workpiece holder 16 can be slid off the way 14 rotated 180° and slid back onto the way. The pin member 68 is then rotated until it extends into the groove 52 where it can contact the ends 56 and 58 of the groove to limit sliding movement of the workpiece holder 16 relative to the way 14. In this new position, the surface 64 on the workpiece holder 16 is in sliding contact with the surface 50 on the way 14 and the surface 66 on the workpiece holder is in sliding contact with the surface 48 on the way. The nut 74 on the pin member 68 is tightened to lock the pin 68 in selected positions.

A first workpiece slot 76 is formed in one end of the workpiece holder 16. The slot 76 has a base 78, sidewalls 80 and 82 and an open side 84. The sidewalls 80 and 82 are spaced apart a distance slightly in excess of the outside diameter of the pipe P to be cut. Pipes P are frequently an oval shape rather than round. It may therefore be necessary to rotate the pipe P about its axis to a position in which the pipe can freely slide between the sidewalls 80 and 82 and contact the base 78.

A second workpiece slot 86 is formed in another end of the workpiece holder 16. The slot 86 has a base 88, sidewalls 90 and 92 and an open side 94. The sidewalls 90 and 92 are spaced apart slightly more than the outside diameter of a pipe P to be cut. As shown in the drawing the second workpiece slot 86 is for a pipe P with a larger diameter than the pipe received in the workpiece slot 76.

A standard jigsaw 12 can accommodate pipe P with diameters up to four inches. The workpiece holder 16 can be provided with workpiece slots that will receive pipe of any diameter that the jigsaw 12 can handle. More than one workpiece holder 16 can be employed with one jigsaw 12 and way 14 to accommodate a larger number of pipe sizes. It would also be possible to design a workpiece holder 16 with more than two workpiece slots.

Saw blade slots 96 and 98 with saw blade slot bases 97 and 99 are provided in the workpiece holder 16 for the passage of the saw blade 32 when cutting a pipe P. These saw blade slots 96 and 98 are perpendicular to the axis of a pipe P that is to be cut. The saw blade slots 96 and 98 extend into the workpiece holder 16 a little past the base 78 or 88 of the workpiece slot 76 or 86. The stops provided by the pin member 68 and the ends walls 56, 58, 60 and 62 of the grooves 52 and 54 prevent the saw blade 32 from contacting the workpiece holder 16 and allow the sawblade to move out of the workpiece slots 76 and 86 a distance sufficient to allow pipes P to be inserted into the workpiece slots.

A handle 18 is attached to the workpiece holder 16 by a bolt 100 that screws into a bore 102 or 104 in the workpiece holder 16. Recesses 106 and 108 in the side of the workpiece holder 16 receive the base portion of the handle 18 and keep the handle from rotating about the axis of the bolt 100. Pipe contact surfaces 110 and 112 on the handle 18 cooperate with the base 78 or 88 of the workpiece slots 76 or 86 to position a pipe P for cutting. If the diameter of the pipe P is not too large, the pipe can be manually held in position for cutting when grasping the handle 18.

Figure 5:
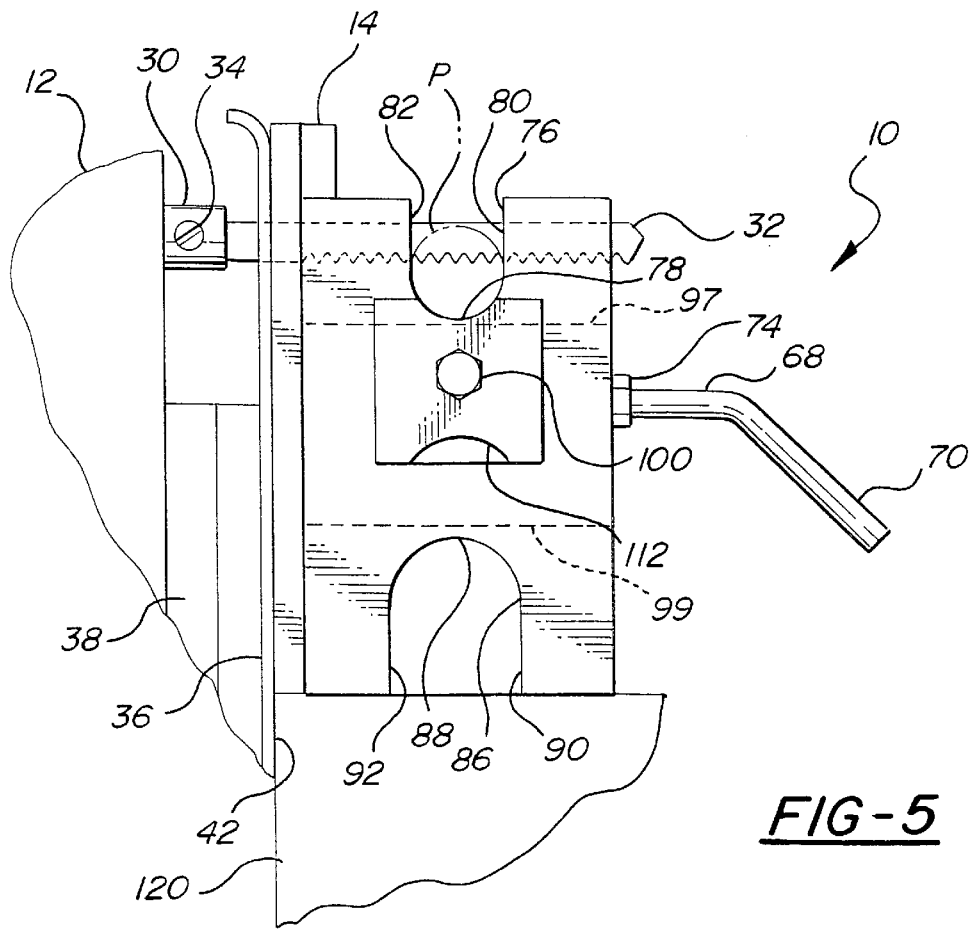
FIG. 5 is a side elevational view of the pipe cutter in operation with portions of the jigsaw broken away.

To cut a pipe P with a pipe cutter 10, the workpiece holder 16 is mounted on the way 14 with a workpiece slot 76 or 86, that corresponds to the size of the pipe to be cut, adjacent to the sawblade 32. The workpiece holder 16 is then slid away from the sawblade 32 to a position which provides sufficient space for the pipe to be inserted into the workpiece slot 76 or 78. The pipe P is then inserted into the workpiece slot 76 or 78. Pipe P is then rotated if necessary and moved into contact with the base 78 or 88 of the workpiece slot 76 or 86 and the pipe contact surface 110 or 112 on the handle 18. The switch 26 is then turned on, the pipe P and the handle 18 are held by the operator of the pipe cutter 10 and the workpiece holder 16 is moved relative to the way 14 toward the sawblade 32. It can be helpful to sit the workpiece holder 16 on a bench or block 120 as shown in FIGS. 1 and 5 and apply pressure to force the sawblade 32 toward the pipe P. Whether pressure is applied through the handle 18 or a support block 120, pressure on the sawblade 32 will tend to hold the pipe P against the base 78 or 88 of the workpiece slot 76 or 86. Once the sawblade 32 saws through the pipe P, the jigsaw 12 can be turned off. The two pieces of cut pipe are removed from the workpiece holder 16. A second cut is made by sliding the workpiece holder 16 away from the sawblade 32 and repeating the procedures set forth above.

Jigsaws 12 have reciprocating sawblades 32. The parts connected to the jigsaw 12 to make it a pipe cutter 10 could also be connected to a saw with a rotating sawblade.

The ends 56, 58, 60 and 62 of the grooves 52 and 54 and the pin member 68 could be replaced by a variety of stops that perform the same function. For example, a fixed stop could be attached to the way 14 that would limit travel of the workpiece holder 16 relative to the way 14.

A dovetail joint for slidably connecting the workpiece holder 16 to the way 14 could be replaced by various track systems. There could for example be tongues or pins on one member that project into grooves or slots in another member.

Figure 6:
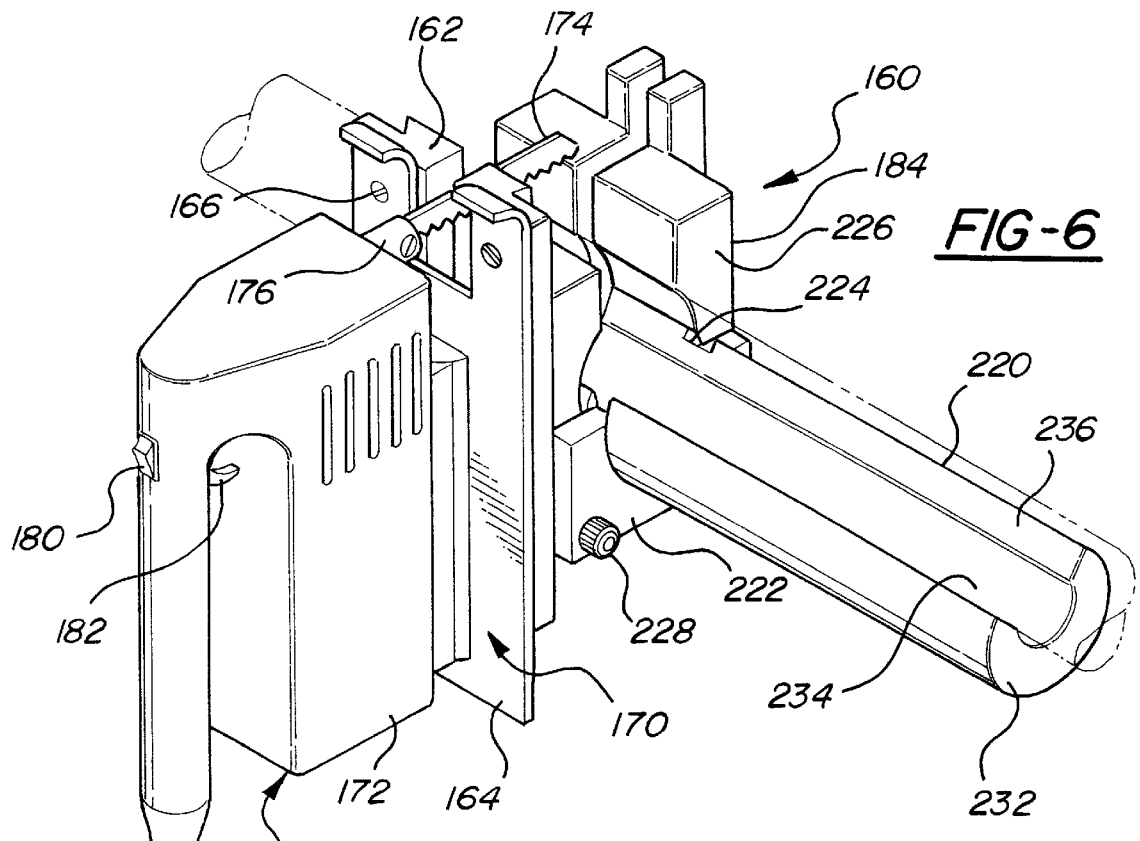
FIG. 6 is a perspective view of a pipe cutter with a modified workpiece holder.
Figure 7:
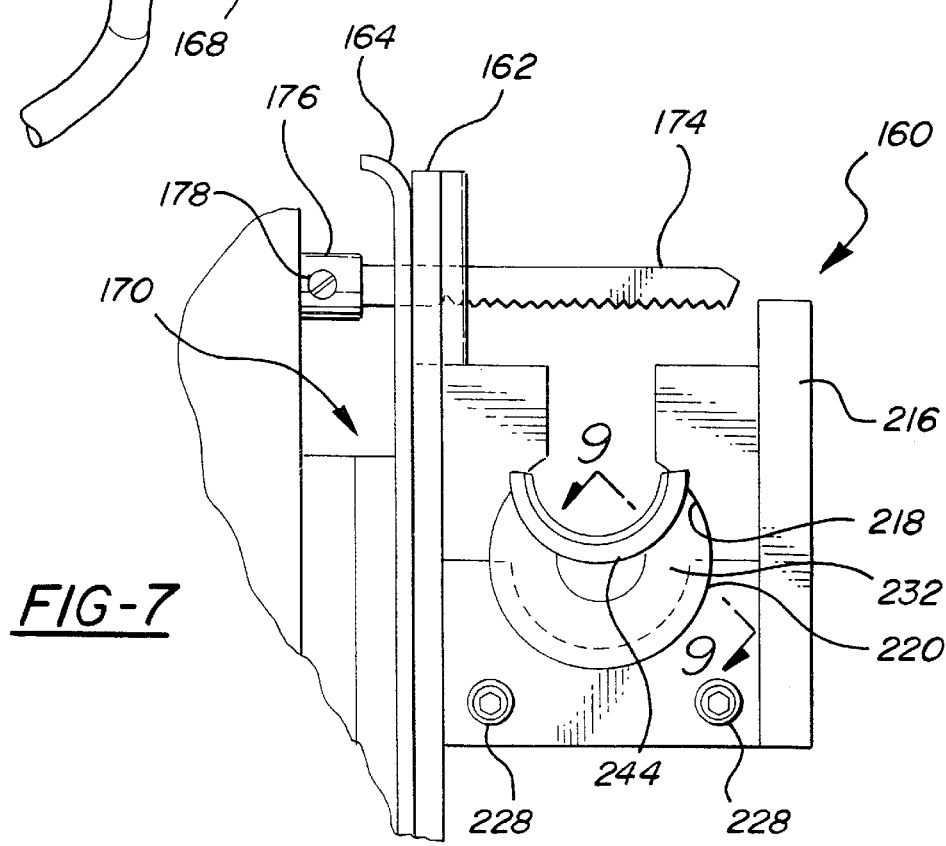
FIG. 7 is an enlarged elevational view of the pipe cutter of FIG. 6 with parts broken away.
Figure 8:
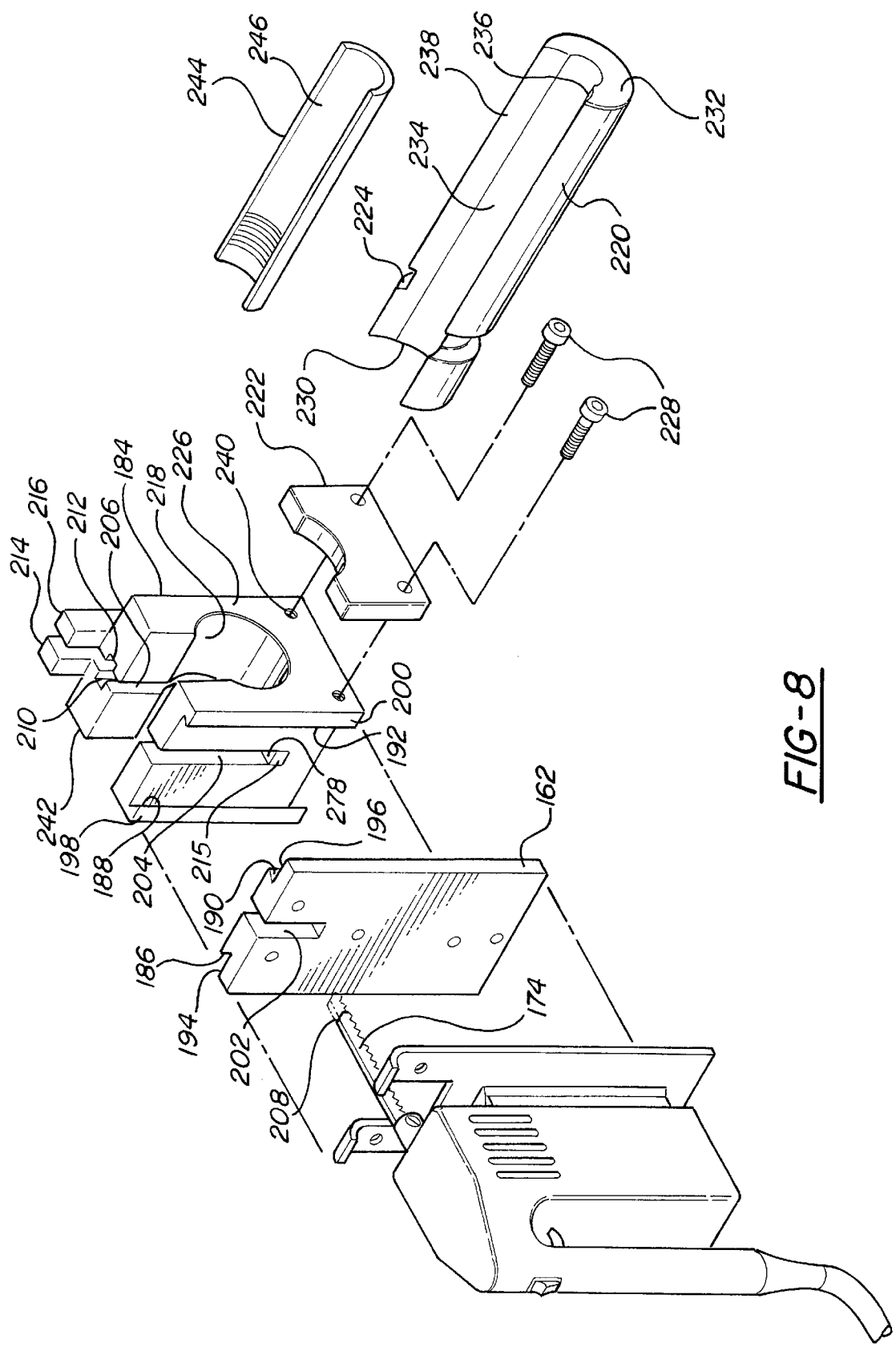
FIG. 8 is an expanded perspective view of the pipe cutter of FIG. 6.

A modified power saw attachment 160 for cutting pipe and rods P is shown in FIGS. 6, 7, and 8. This attachment 160 includes a way 162 that is generally the same as the weight 14 described above. The way 162 is secured to the shoe plate 164 by screws 166. The shoe plate 164 is part of a jigsaw 168 and is attached to a mounting block assembly 170. The mounting block 170 is secured to the housing 172 of the jigsaw 168. A saw blade 174 is received in a slot in a shaft 176 and clamped in place by a screw 178. When the switch 180 or switch 182 is turned on, a motor in the housing 172 reciprocates the shaft 176 into and out of the housing 172. The jigsaw 168 is the same as the jigsaw 12 describe above and is substantially the same as the jigsaws manufactured by several companies.

A workpiece holder 184 is slideable secured to the way 162, with surface 186 on the way in sliding contact with the surface 188 on the holder and with surface 190 on the way in sliding contact with surface 192 on the holder. The flat surfaces 194 and 196 on the way 162 are also in sliding contact with the surfaces 198 and 200 on the holder 184. The surface which are in sliding contact with each other limit the workpiece holder to movement in a plane which is substantially perpendicular to any plane through the long axis of the reciprocating shaft 176. Stops (not shown) limit sliding movement of the workpiece holder 184 relative to the way 162.

The saw blade 174 extends through a slot 202 in the way 162. Slots 204 and 206 and the workpiece holder 184 also receive the saw blade 174 when the workpiece holder is slid toward the end of the way with the slot 202. The free end of the saw blade 174 preferably has a portion 208 without teeth. This portion 208 guides the saw blade in the slot 206 and eliminates damage to the slot. Hardened metal plates 210 and 212 are provided in the walls of the slot 206 where they can contact the portion 208 of the saw blade 174 and keep the saw blade centered within the slot. A pair of parallel bars 214 and 216 are integral with the workpiece holder 184 and positioned on opposite sides of the slot 206. These bars 214 and 216 allow the sawblade 174 to reciprocate back and forth without the portion 208 on the free end projecting out of the slot 206. A hardened metal plate 215 can be secured in the base of the slots 204 and 206 to prevent damage to the workpiece holder 184. This plate 215 can serve as a stop to limit movement of the holder 184 relative to the way 162. The plate 215 can be integral with the plates 210 and 212 and all three plates can be replaceable.

A central bore 218 passes through the workpiece holder 184. The axis of the central bore 218 is transverse to the direction of movement of the holder 184 relative to the way 162 and to the direction of movement of the sawblade 174.

A workpiece engaging block 220 is rotatably journaled in the central bore 218 of the workpiece holder 184. A block retaining plate 222 is inserted in a groove 224 in the block 220 and secured to the wall 226 of the block by screws 228. The retaining plate 222 holds the workpiece engaging block 220 in the central bore 218 while leaving it free to rotate in the central bore 218. The end 230, of the workpiece engaging block 220, extends into the central bore 218 up to the slot 204 and the slot 206. In this position, the workpiece engaging block 220 does not interfere with movement of the sawblade 174 and the slots 204 and 206. The free end 232 of the workpiece engaging block 220 extends out of the workpiece holder a distance sufficient to provide a handle that can be held by a person while cutting a rod or pipe P.

A first workpiece engaging surface 234 in workpiece engaging block 220 is a portion of a cylindrical surface with a first engaging surface axis that is parallel to the axis of the central bore 218. The diameter of a cylinder having the engaging surfaces 234 is slightly larger than the outside diameter of the smallest pipe that is to be cut using the workpiece engaging block 220.

A pair of second workpiece engaging surfaces 236 and 238 are formed in the workpiece engaging block 220 on either side of the first workpiece engaging surface 234. The second engaging surfaces 236 and 238 are part of a surface of a cylinder having a second engaging surface axis that is parallel to the axis of the central bore 218. The cylinder that includes the second engaging surfaces 236 and 238 has a diameter that is slightly larger than the outside diameter of a larger pipe that is to be cut using the workpiece engaging block 220.

A pair of third workpiece engaging surfaces could be provided if desired. If a pair of third workpiece engaging surfaces is provided, it may be desirable to increase the diameter of the workpiece engaging block 220 and the central bore 218. A V-shaped slot could be formed in the workpiece engaging block 220 rather than cylindrical surfaces. The contact between the pipe P and the walls of a V-shaped groove would be two lines. The larger contact surfaces provided by the cylindrical surfaces described above produce more accurate cuts when cutting pipes having a diameter that corresponds to the size of the cylindrical surfaces in the workpiece engaging block 220.

The workpiece engaging block 220 can be removed from the workpiece holder 184 by removing two bolts 228, sliding the retaining plate 222 from the groove 224 and then sliding the workpiece engaging block from the central bore 218 in the workpiece holder 184. A new workpiece engaging block 220 for pipes with different diameters can replace the original workpiece engaging block. The workpiece engaging block 220 can also be placed in the opposite end of the central bore 218 thereby making it possible to accommodate both left handed and right handed individuals. Threaded bores 240 that receive the screws 228 are provided on both sides of the workpiece holder 184 so that the block retaining plate 222 can be clamped to the wall 226 or the wall 242.

Flexible pipes used for gas lines have to be cut to length. To eliminate corrosion and other problems experienced in the past with flexible pipes carrying natural gas to appliances, it is common to use flexible stainless steel pipes in buildings. To form good joints with flexible pipes it is necessary to cut the ends that are to be joined in a plane that is perpendicular to the center line of the pipe and to cut the pipe ends that are joined together at the same position relative to their corrugated shape. By cutting the pipe ends at the same position, they will have substantially the same diameter apertures. To make such cuts in flexible stainless steel pipe it is necessary to axially position the pipe relative to the sawblade 174 and to ensure that the pipe does not move axially during cutting.

The flexible pipe holder 244 shown in FIGS. 7, 8, and 9 is secured to the second workpiece engaging surfaces 236 and 238 of the workpiece engaging block 220. An adhesive or removable fasteners can be used to secure the flexible pipe holder 244 in place. The flexible pipe holder 244 could also be an integral part of the workpiece engaging block 220 if desired. As shown the flexible pipe holder includes a smooth pipe engaging surface 246 and a section 248 with lands 250 and grooves 252. The smooth surface 246 can be a portion of the surface of a cylinder with a diameter that is slightly larger than the outside diameter of the flexible pipe if the pipe does not have a plastic cover. If the flexible pipe is inside the usual plastic tube, the smooth surface 246 must have a radius that is sufficient to receive the plastic tube. The lands 250 of the section 248 are received in grooves in the flexible pipe. A pipe inside a plastic tube must have a section of the plastic tube removed so that the lands 250 can engage the grooves in the flexible pipe.

The lands 250 and the flexible pipe holder 244 axially fix a flexible pipe relative to the sawblade 174 so that a superior cut through the pipe can be made. Holders similar to the holder 244 can be designed to accommodate irregular surfaces on other members that are to he cut. Workpiece engaging blocks 220 can also be designed to accommodate pipes with a smooth outer surface that is not round.

The ways 14 and 162 described above are clamped to the shoe plate 236 or 164 by mechanical fasteners. Some jigsaws 12 or 168 have shoe plates 14 or 162 that are easily removable and a jigsaw housing to which a way member may be secured. Securing a weigh member similar to the weighs 14 and 162 directly to a jigsaw housing can provide a stronger and more stable connection.

FIGS. 10 and 11 show a way 260 for a Makita (a trademark of Makita Corporation of America) saw. The way 260 has slots 262 and 264 that a saw flange mount is received in. A removable pin is inserted into bores 266 and 268 to anchor the way 260 on the saw flange mount. A stop 269 is provided at one end of the way 260.

FIGS. 12 and 13 show a way 270 for a Porter Cable (a trademark of Porter Cable Corporation) saw. The way 270 has two flanges 272 and 274. A portion of the saw housing is positioned between the flanges 272 and 274. Screws are inserted into the bores 276 through the flanges 272 and 274 and screwed into the saw housing to clamp the way 270 to the housing. A stop 277 is provided at one end of the way 270.

During operation of the powersaw attachment 160 a pipe P, which is to be cut, is placed on the first workpiece engaging surface 234 or the second workpiece engaging surfaces 236 and 238 and held manually by grasping the pipe P and the workpiece engaging block 220. The saw is turned on and the sawblade 174 is moved into engagement with the pipe P. Pressure is applied to the sawblade 174 and the pipe is cut. Upon reaching a point in which the sawblade is in contact with one continuous surface and has cut through both sides of the pipe, the cutting rate tends to decrease. The decrease in cutting rate is due in part to the failure of the teeth of the sawblade 174 to discharge chips. By manually rotating the workpiece engaging block 220 a few degrees about the axis of the central bore 218, chips are discharged and the cutting rate increases. This procedure also eliminates a large burr on one of the two severed pipe ends.

A stop, if used, allows the sawblade 174 to completely sever workpieces but stops the sawblade before it contacts the surface 278 at the bottom of the slots 204 and 206 and the workpiece holder 184.

The cutting rate when cutting a thin walled pipe does not decrease appreciably at the end of a cut because the teeth in the sawblade 174 are able to discharge chips. There is therefore no critical reason to rotate the flexible pipe holder 244. The flexible pipe holder 244 could therefore be a fixed part of the workpiece holder 184.

As described above and shown in the drawing, the ways 14, 162, 260 and 270 have a tenon and the workpiece holders 16 and 184 have a mortise. If desired the mortise could be on the ways and the tenon could be on the workpiece holders. The way 14 is merely a member, that supports and guides the workpiece holder 16, and can take a number of well known forms.

The disclosed embodiments are representative of presently preferred forms of the invention, but is intended to be illustrative rather than definitive thereof. The invention is defined in the claims.

I claim:

1. A pipe cutter comprising a power saw with a reciprocal saw blade; a way rigidly secured to the saw; a workpiece holder slideably mounted on the way for linear movement along the way in a workpiece direction of movement that is generally perpendicular to a saw blade direction of reciprocal movement and having a workpiece slot with a base, two sidewalls and an open side, and a saw blade slot in the workpiece holder which is generally perpendicular to the workpiece slot; and a workpiece engaging block rotatably journaled in said workpiece holder and having a first workpiece engaging surface.

2. A pipe cutter as set forth in claim 1 including a pair of spaced apart second workpiece engaging surfaces, on the workpiece engaging block, that are arcs of a cylindrical surface with a second radius, and wherein the first workpiece engaging surface has a first radius that is smaller than the second radius of the second workpiece engaging surfaces.

3. A pipe cutter as set forth in claim 1 including a pipe receiving slot in the workpiece engaging block having lands and groves that are perpendicular to an axis of workpiece engaging block.

4. A method of cutting a pipe with a pipe cutter having a power saw with a saw blade, a way rigidly secured to the saw, a workpiece holder slidably mounted on the way and having a workpiece slot in the workpiece holder that includes a base, two side walls, an open side, sawblade slot and a workpiece engaging block rotatably journaled in said workpiece holder comprising:

a) moving the workpiece holder relative to the way to separate the workpiece slot from the saw blade;

b) inserting a pipe to be cut into the workpiece slot in the workpiece holder and into engagement with said workpiece engaging block;

c) moving the workpiece holder parallel to the way to move the saw blade toward the base of the workpiece slot and into contact with the pipe;

d) applying force to the saw blade to urge the pipe toward the base of the workpiece slot and to simultaneously cut the pipe; and e) rotating the pipe and the workpiece engaging block relative to the workpiece holder while simultaneously moving the workpiece holder along a linear path parallel to the way and cutting the pipe.

5. A method of cutting a pipe with a pipe cutter as set form in claim 4 including mounting the workpiece holder on the way with the workpiece slot of the correct size for the pipe to be cut adjacent to the saw blade.

6. A method of cutting a pipe with a pipe cutter as set forth in claim 5 including attaching a handle to the workpiece holder with a pipe contact surface on the handle in a position to cooperate with the base of the workpiece slot to hold the pipe in alignment with the saw blade.

* * * * *